United States Patent
Soni

(10) Patent No.: US 9,836,311 B2
(45) Date of Patent: Dec. 5, 2017

(54) SYSTEM AND METHOD FOR MANAGEMENT OF REBOOT PARAMETERS

(71) Applicant: Avaya Inc., Santa Clara, CA (US)

(72) Inventor: Sandeep Soni, Pune (IN)

(73) Assignee: Avaya Inc., Santa Clara, CA (US)

( * ) Notice: Subject to any disclaimer, the term of this patent is extended or adjusted under 35 U.S.C. 154(b) by 85 days.

(21) Appl. No.: 14/810,728

(22) Filed: Jul. 28, 2015

(65) Prior Publication Data

US 2017/0034222 A1    Feb. 2, 2017

(51) Int. Cl.
  *H04L 29/06* (2006.01)
  *G06F 9/44* (2006.01)
  *H04L 29/08* (2006.01)

(52) U.S. Cl.
  CPC ........ *G06F 9/4416* (2013.01); *H04L 65/1053* (2013.01); *H04L 67/02* (2013.01)

(58) Field of Classification Search
  USPC ....... 709/228, 222, 224, 250, 221, 203, 217, 709/219, 227; 715/753, 704, 730
  See application file for complete search history.

(56) References Cited

U.S. PATENT DOCUMENTS

| | | | | |
|---|---|---|---|---|
| 6,813,631 B2 * | 11/2004 | Pouchak | ............. | H04L 61/2038 237/7 |
| 7,269,722 B1 * | 9/2007 | Neary | ................... | G06F 9/4401 703/22 |
| 9,037,980 B2 * | 5/2015 | Gastaldi | ................ | G06Q 10/10 715/753 |
| 9,432,254 B1 * | 8/2016 | Naqvi | ................... | H04L 41/084 |
| 2005/0070249 A1 * | 3/2005 | Lee | ........................ | H04W 12/12 455/410 |
| 2006/0136358 A1 * | 6/2006 | Sonkin | ............. | G06F 17/30306 |
| 2010/0112968 A1 * | 5/2010 | Mackey | .............. | G06F 9/44505 455/186.1 |
| 2012/0117563 A1 * | 5/2012 | Chang | ................. | G06F 9/45558 718/1 |
| 2012/0233625 A1 * | 9/2012 | Sabin | .................... | G06F 9/5072 718/105 |
| 2015/0039892 A1 * | 2/2015 | Fujita | .................... | H04L 9/3226 713/171 |
| 2015/0339736 A1 * | 11/2015 | Bennett | ................. | G06Q 30/02 705/306 |
| 2016/0072919 A1 * | 3/2016 | Bailey | ....................... | G06F 9/54 709/222 |

* cited by examiner

*Primary Examiner* — Jude Jean Gilles
(74) *Attorney, Agent, or Firm* — Sheridan Ross P.C.

(57) ABSTRACT

A request to establish a communication session is received. A clone of a communication system object with configuration information is produced and associated with a session identifier for the communication session. The session identifier for the communication session is sent to a client. When an administrator wants to make updates to re-bootable parameter(s) in the configuration information, the re-bootable parameter(s) are updated in the clone of the communication system object based on the session identifier. A message to save the session information with the session identifier is received. In response to receiving the save session information message, the clone with the updates to the re-bootable parameter(s) is sent to the communication system. This results in the communication system rebooting. By updating multiple re-bootable parameters in the clone of the communication system, a single reboot will occur. This reduces the total number of reboots that would have occurred previously.

20 Claims, 3 Drawing Sheets

SYSTEM AND METHOD FOR MANAGEMENT OF REBOOT PARAMETERS

TECHNICAL FIELD

The systems and methods disclosed herein relate to communication systems and in particular to management of configuration parameters in communication systems.

BACKGROUND

When a user administers a communication system, such as a Private Branch Exchange (PBX), the user may want to change multiple parameters of the communication system. Changing multiple parameters works fine as long as the parameters do not require a reboot of the communication system. However, if the user wants to change multiple parameters that each requires a reboot of the communication system, the system will be rebooted for each change of each re-bootable parameter. This can lead to extensive down time if multiple parameters cause the communication system to be rebooted for each parameter.

This problem becomes even more difficult to resolve when stateless protocols, such as Representational State Transfer (REST) are used. Because of REST's stateless nature, REST requires that each re-bootable parameter be sent using a separate message. Like as previously described, the communication system must be reboot each time a re-bootable parameter is changed.

To address this problem, one solution that uses REST is to maintain a local copy of the configuration information (e.g., re-bootable parameters). The changes are managed by the client. When the changes are complete, the changes are then pushed back to the server. The server can then reboot based on the changes. The problem with this solution is that the client becomes more complicated and more difficult to maintain. This thwarts the whole purpose of REST where the clients are designed to be simple.

SUMMARY

Systems and methods are provided to solve these and other problems and disadvantages of the prior art. A request to establish a communication session is received. A clone of a communication system object with configuration information is produced and associated with a session identifier for the communication session. The session identifier for the communication session is sent to a client. When an administrator wants to make updates to a re-bootable parameter(s) in the configuration information, the re-bootable parameter(s) are updated in the clone of the communication system object based on the session identifier. A message to save the session information with the session identifier is received. In response to receiving the save session information message, the clone with the updates to the re-bootable parameter(s) is sent to the communication system. This results in the communication system rebooting. By updating multiple re-bootable parameters in the clone of the communication system, a single actual reboot of the communication system will occur. This reduces the total number of reboots that would have occurred previously, thereby reducing the overall downtime of the system.

In one embodiment, REST is used. The above process uses a unique session management layer within REST to address REST's stateless only limitation. This allows clients to track specific session information of active sessions on the PBX. The session information can be saved for use in tracking the session. For example, information such as the session creator, creation time, and IP details can be saved and utilized by both the PBX and the clients using REST. This allows REST servers to maintain REST Application Programming Interfaces (APIs) and keep the statelessness of REST intact. This solution also uses existing REST messages and therefore does not require additional bandwidth/messages. In addition, this solution maintains the simplicity of the REST client.

DETAILED DESCRIPTION

Figure 1:
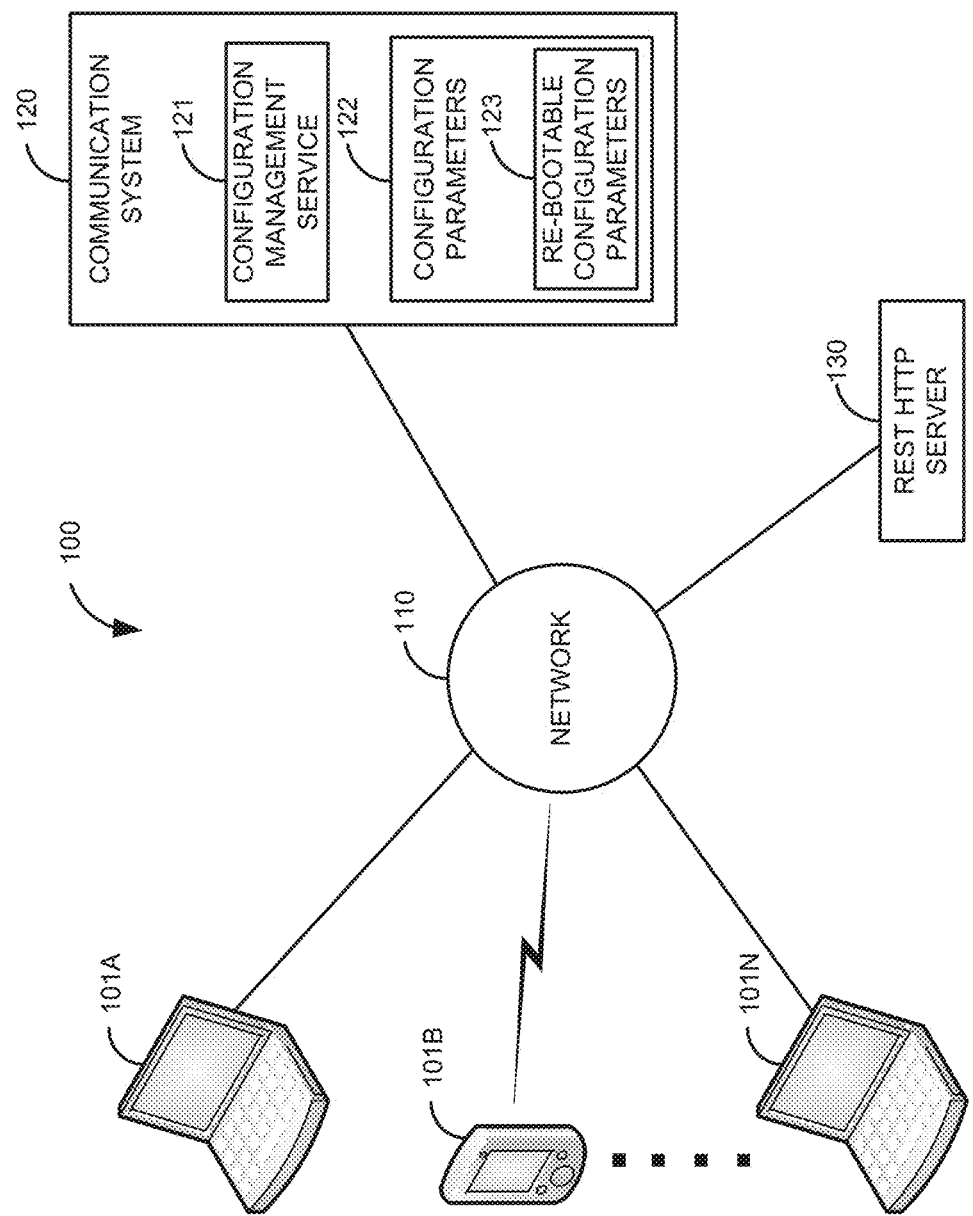
FIG. 1 is a block diagram of a first illustrative system for managing re-bootable parameters of a communication system.

FIG. 1 is a block diagram of a first illustrative system for managing re-bootable configuration parameters 123 of a communication system 120. The first illustrative system 100 comprises clients 101A-101N, a network 110, a communication system 120, and a Representational State Transfer (REST) Hyper Text Transport Protocol (HTTP) server 130.

The client 101 can be or may include any hardware device that can communicate on the network 110, such as a Personal Computer (PC), a telephone, a cellular telephone, a Personal Digital Assistant (PDA), a tablet device, a smart phone, a notebook device, a laptop computer, and/or the like. As shown in FIG. 1, any number of clients 101A-101N may be connected to the network 110, including only a single client 101. The client 101 is typically used to administer the communication system 120. In one embodiment the client 101 is a REST client.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), REST, HTTP, and the like. Thus, the network 110 is an electronic communication network configured to carry messages via packets and/or circuit switched communications.

The communication system 120 can be or may include any hardware coupled with software that can manage communications on the network 110, such as a Private Branch Exchange (PBX), a communication manager, a session manager, a communication processor, a central office switch, a router, a hub, a email server, an Instant Messaging server, a video switch, a video router, a network management system, a client 101, and/or the like. The communication system 120 further comprises a configuration management service 121 and configuration parameters 122. The configuration management service 121 can be or may include any hardware/software that can be used to configure the communication system 120.

The configuration parameters 122 can be or may include any parameters that can be used to configure the communication system 120. The configuration parameters 122 may include re-bootable configuration parameters 123 that require the communication system 120 to reboot when changed.

The REST HTTP server 130 can be or may include any hardware coupled with software that can manage REST/HTTP communications with the clients 101A-101N, such as a communications server, a web server, and/or the like. The REST HTTP server 130 is shown being separate from the communication system 120. However, in one embodiment, the REST HTTP server 130 may be included as a module in the communication system 120.

Figure 2:
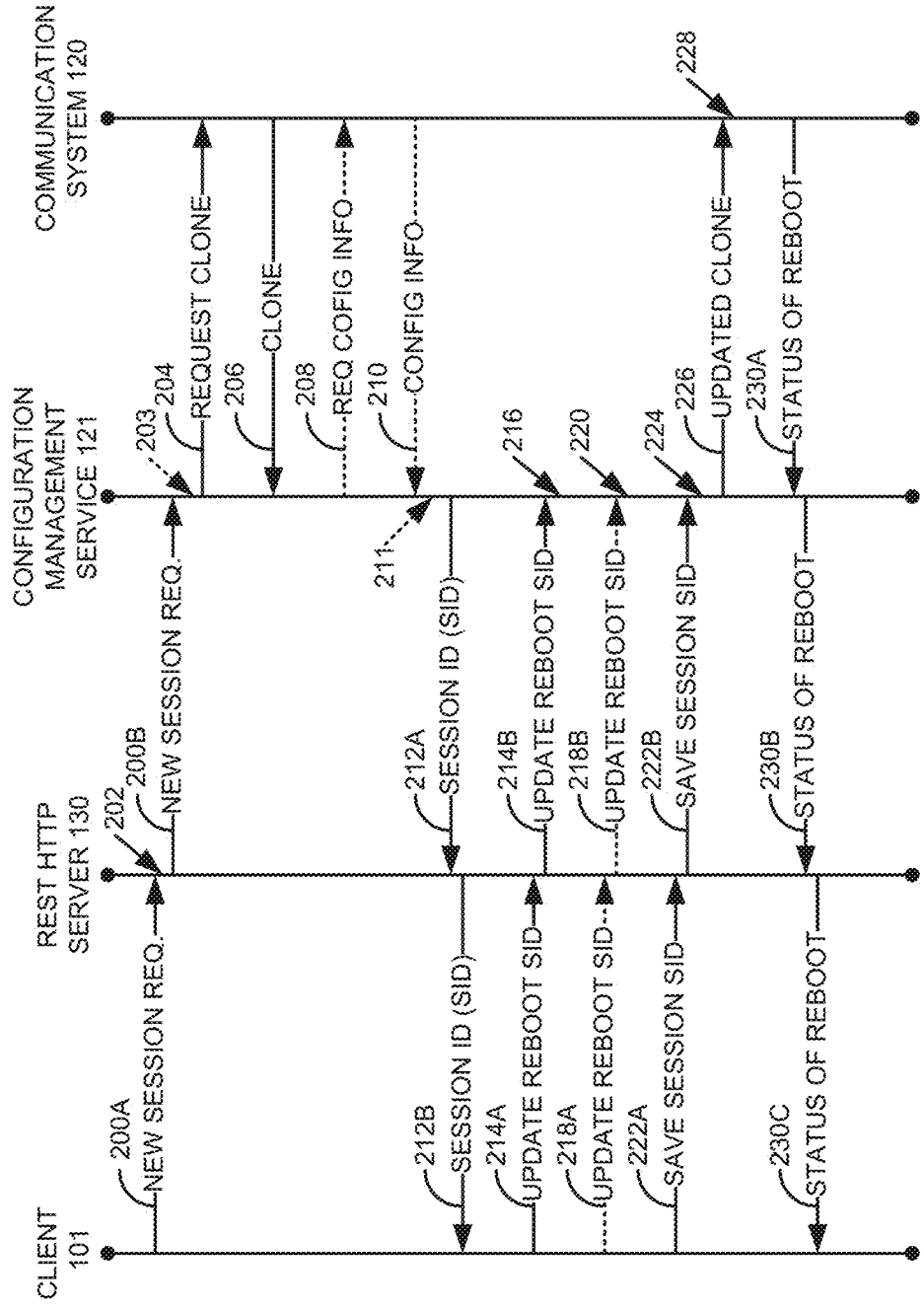
FIG. 2 is a flow diagram of a first exemplary process for managing re-bootable parameters of a communication system.
Figure 3:
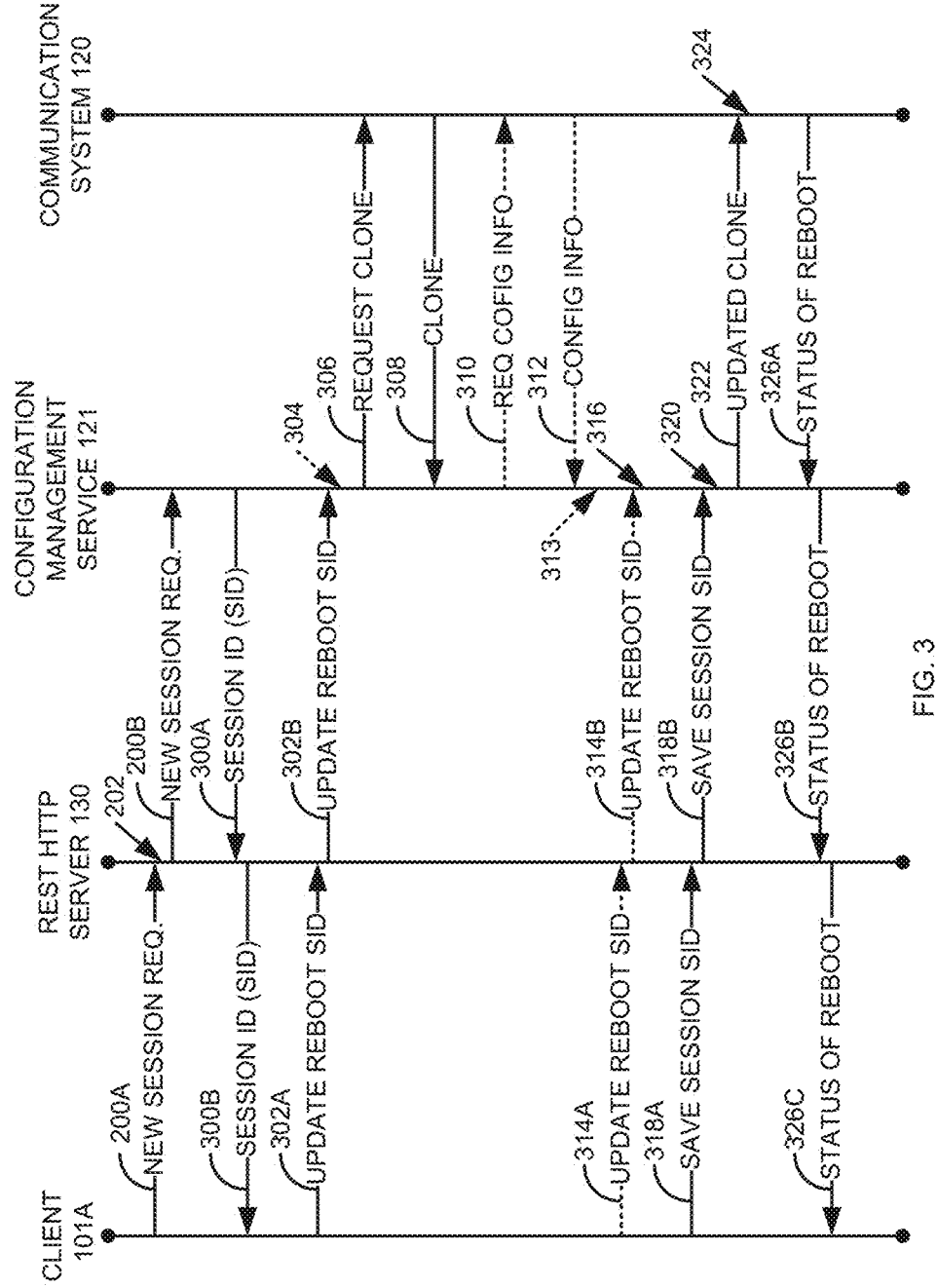
FIG. 3 is a flow diagram of a second exemplary process for managing re-bootable parameters of a communication system.

FIG. 2 is a flow diagram of a first exemplary process for managing re-bootable configuration parameters 123 of a communication system 120. Illustratively, the clients 101A-101N, the communication system 120, the configuration management service 121, and the REST HTTP server 130 are stored-program-controlled entities, such as a computer or processor, which performs the method of FIGS. 2-3 and the processes described herein by executing program instructions stored in a non-transitory computer readable storage medium, such as a memory or disk. Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The processes describes in FIGS. 2-3 are described using REST/HTTP protocols. However, the descriptions in FIGS. 2-3 are not limited to any specific protocol. One of skill in the art would recognize that the process described in FIGS. 2-3 may be implemented using a one or more protocols, such as SIP, IP, User Datagram Protocol (UDP), Transmission Control Protocol (TCP), proprietary protocols, REST, HTTP, and/or the like. In addition, some of the messages described in FIGS. 2-3 may not show well known messages, such as acknowledgement messages (e.g., acknowledgement messages for steps 214, 218, 222, 302, 314, and 318).

The process starts in step 200A when new session request is sent by the client 101A (e.g., a REST POST new session request). For example, the request for the new session is sent when an administrator wants to administer configuration information for the communication system 120. The REST HTTP server 130 authenticates REST POST new session request in step 202. For example, the REST HTTP server 130 (e.g., a web server) requests the user to provide a user name and password. After authenticating the user in step 202, the REST HTTP server 130 sends the REST POST new session request to the configuration management service 121 in step 200B.

In one embodiment, the configuration management service 121, in response to receiving the REST POST new session request of step 200B sends a request to get a clone of a communication system object that includes configuration information in step 204. The clone of the communication system object includes configuration information for the communication system 120. The configuration information can include a variety of configuration parameters 122 that can be configured, such as a dial plan, IP addresses, ports, Media Access (MAC) addresses, a sub-net mask(s), a country code, a trunk channel, a line type, an option to enable Cyclic Redundancy Checking (CRC), line numbering, a clock source, a national prefix, an international prefix, a port identifier, a speaker volume, and/or the like. The configuration information may include re-bootable configuration parameters 123 that require the communication system 120 to reboot in order for the re-bootable configuration parameters 123 to become effective. The configuration information may include configuration parameters 122 that do not require the communication system 120 to reboot when changed. The communication system 120 sends a clone of the communication system object that includes the configuration information in step 206. The clone of the communication system object will have the configuration information as currently administered.

In another embodiment (indicated by the dashed lines), instead of sending the request for a clone of the communication system object in step 204, the configuration management service 121 creates the clone of the communication system object in step 203 (in response to the REST POST new session request of step 200B). The configuration management service 121 sends a request to get the configuration information in step 208. The communication system 120 sends the configuration information in step 210. The configuration management service 121 populates the clone of the communication system object with the configuration information in step 211.

At this point, the configuration management service 121 has a clone of the communication system object with the configuration information. The configuration management system responds by sending a message with a session identifier (SID) in step 212A. The session identifier can be any unique identifier for the communication session, such as a Global Session Identifier (GSID), a dialog session identifier, and/or the like. The REST HTTP server 130 sends a REST response message (e.g., in Extended Markup Language (XML)) that includes the session identifier in step 212B.

The client 101 sends in step 214A an update of a re-bootable parameter request that includes the session identifier (e.g., using HTTP). For example, the message of step 214A may be sent when an administrator wants to change an IP address of the communication system 120. The HTTP/REST server 130 sends the update of the re-bootable parameter with the session identifier in step 214B to the configuration management service 121. The configuration management service 121 updates the re-bootable configuration parameter 123 in the configuration information of the clone in step 216. The update of the configuration information is based on the session identifier.

The client 101 can optionally send (indicated by the dashed lines) an update of a second re-bootable parameter using the session identifier in step 218A. The REST HTTP server 130 sends the request to update the second re-bootable parameter in step 218B to the configuration management service 121. The configuration management service 121 updates the second re-bootable configuration parameter 123 in step 220. The messages of steps 214 and 218 may update multiple configuration parameters 122/123. The process of steps 218-220 can be repeated for additional changes to configuration parameters 122/123 that may be re-bootable configuration parameters 123 or non re-bootable configuration parameters 122.

The client 101 sends a REST message to save the session information with the session identifier in step 222A. The REST HTTP server 130 sends the message to save the session information with the session identifier in step 222B. The configuration management service 121 updates the clone with any changes in the save message in step 224. The configuration management service 121 sends the updated clone of the communication system object (with the updates of steps 216, 220, and 224) to the communication system 120 in step 226.

The communication system 120 receives the updated clone object for the communication system 120 in step 226. The communication system 120 merges the changes into the live communication system object and reboots the communication system 120 in step 228. In this example, the reboot is necessary because one or more re-bootable configuration parameters 123 were changed. However, if the objects changed in step 214/218 were not re-bootable objects, the reboot of step 228 would be unnecessary. In response to the reboot, the communication system 120 sends a status of the reboot to the client 101, via the configuration management service 121 and the REST HTTP server 130 in steps 230A-230C.

The advantage of changing re-bootable configuration parameters 123 in the clone is that a reboot is unnecessary when each change is made. In FIG. 2, two re-bootable configuration parameters 123 were changed before a reboot occurred. In the prior art, two reboots would have been necessary, one for each changed re-bootable configuration parameter 123.

FIG. 3 is a flow diagram of a second exemplary process for managing re-bootable configuration parameters 123 of a communication system 120. The process starts in step 200A when new session request is sent by the client 101 (e.g., a REST POST new session request). The REST HTTP server 130 authenticates REST POST new session request in step 202. After authenticating the user in step 202, the REST HTTP server 130 sends the REST POST new session request to the configuration management service 121 in step 200B.

The configuration management system responds by sending a message with a session identifier (SID) in step 300A. The session identifier can be any unique identifier for the communication session, such as a Global Session Identifier (GSID), a dialog session identifier, and/or the like. The REST HTTP server 130 sends a REST response message (e.g., in Extended Markup Language (XML)) that includes the session identifier in step 300B.

The client 101 sends, in step 302A, an update of a re-bootable parameter request that includes the session identifier. For example, the message of step 302A may be sent when an administrator wants to change a MAC address of the communication system 120. The HTTP/REST server 130 sends the update of the re-bootable parameter with the session identifier in step 302B to the configuration management service 121. The configuration management service 121 updates the re-bootable configuration parameter 123 in the configuration information of the clone in step 304. The update of the configuration information is based on the session identifier.

In addition, the configuration management service 121 determines whether the configuration parameter 122 of step 302 is a re-bootable configuration parameter 123. The configuration management service 121 can determine if a configuration parameter 122 is a re-bootable configuration parameter 123 in various ways. For example, the configuration management service 121 can determine that a configuration parameter 122 is re-bootable configuration parameter 123 based on a list of defined re-bootable configuration parameters 123. Alternatively, a re-bootable configuration parameter 123 can be determined based on an object type or number range (e.g., where re-bootable configuration parameters 123 are defined based on numbers). As used herein, the term re-bootable configuration parameter 123 is used to refer to any parameter or collection of parameters that will require a system re-boot prior to having the re-bootable configuration parameter 123 set from an value to a new/changed value.

In one embodiment, the configuration management service 121, in response to determining that the configuration parameter 122 is a re-bootable configuration parameter 123 in step 304, the configuration management service 121 sends a request to get a clone of a communication system object that includes configuration information in step 306. The clone of the communication system object includes configuration information for the communication system 120. The communication system 120 sends the clone of the communication system object that includes the configuration information in step 308. The clone of the communication system object will have the configuration information as currently administered.

In another embodiment (indicated by the dashed lines), instead of sending the request for a clone of the communication system object in step 306, the configuration management service 121 creates the clone of the communication system object in step 304 (in response to the request to update the re-bootable parameter of step 302B). The configuration management service 121 sends a request to get the configuration information in step 310. The communication system 120 sends the configuration information in step 312. The configuration management service 121 populates the clone of the communication system object with the configuration information in step 313.

The client 101 can optionally send (indicated by the dashed lines) an update of a second re-bootable parameter using the session identifier in step 314A. The REST HTTP server 130 sends the request to update the second re-bootable parameter in step 314B to the configuration management system 121. The configuration management service 121 updates the second re-bootable configuration parameter 123 in step 316. The messages of steps 302 and 314 may update multiple configuration parameters 122/123. The process of steps 314-316 can be repeated for additional changes to configuration parameters 122 that may be re-bootable configuration parameters 123 or non re-bootable configuration parameters 122.

The client 101 sends a REST message to save the session information with the session identifier in step 318A. The REST HTTP server 130 sends the message to save the session information with the session identifier in step 318B. The configuration management service 121 updates the clone with any changes in the save message in step 320. The configuration management service 121 sends the updated clone of the communication system object (with the updates of steps 304, 316, and 320) to the communication system 120 in step 322.

The communication system 120 receives the updated clone object for the communication system 120 in step 322. The communication system 120 merges the changes into the live communication system object and reboots the communication system 120 in step 324. In this example, the reboot is necessary because one or more re-bootable configuration parameters 122 were changed. In response to the reboot, the communication system 120 sends a status of the reboot to the client 101, via the configuration management service 121 and the REST HTTP server 130 in steps 326A-326C.

In this embodiment, the communication system object is only cloned if a re-bootable object is updated. If no re-bootable objects are updated, the configuration management service 121 will not create/receive a clone of the communication system object.

The session identifier described in FIGS. 2-3 is used by the configuration management service 121 to track messages associated with the communication session. For example, two different administrators may each have a separate communication sessions that are open concurrently. In this example, there would be two separate communication system objects created with different session identifiers. If a reboot is required, the configuration management system sends multiple updated clones that are merged in steps 228 and 324.

Alternatively, the process of FIGS. 2-3 may only allow a single administrative communication session to run concurrently. This embodiment does not require the session identifier because there is only a single administrative communication session. For example, none of the messages of FIGS. 2-3 would require a session identifier.

The processes of FIG. 2-3 may be implemented using encryption. For example, the messages described in FIGS. 2-3 may be implemented over HTTPs (secure HTTP).

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
receiving, by a microprocessor, a request to establish a communication session;
performing one of:
   i. sending, by the microprocessor, a request to a communication system to get a clone of a communication system object that includes configuration information; and receiving the clone of a communication system object that includes the configuration information; and
   ii. creating, by the microprocessor, the clone of the communication system object; sending a request to get the configuration information; receiving the configuration information; and populating the clone of the communication system object with the configuration information;
following the performing step, receiving, by the microprocessor, a first request to update a first configuration parameter in the configuration information; and
updating, by the microprocessor, the first configuration parameter in the configuration information of the clone of the communication system object.

2. The method of claim 1, wherein the first request to update the first configuration parameter includes a session identifier and further comprising the steps of:
sending the session identifier for the communication session;
receiving a second request that includes the session identifier to update a second configuration parameter in the configuration information; and
updating the second configuration parameter in the configuration information of the clone of the communication system communication system object.

3. The method of claim 2, further comprising the steps of:
receiving a session save session command with the session identifier; and
in response to receiving the save session command:
   updating the clone of the communication system object; and
   sending the updated clone of the communication system object.

4. The method of claim 3, further comprising the steps of:
receiving the updated clone of the communication system object; and
in response to receiving the updated clone of the communication system object, rebooting the communication system.

5. The method of claim 4, further comprising the step of:
in response to rebooting the communication system, sending a response that includes a status of the reboot.

6. The method of claim 1, wherein the request to establish the communication session is Representational State Transfer (REST) request and further comprising:
sending, by a client the REST request;
receiving, from the client, the REST request at a REST Hyper Text Transfer Protocol (HTTP) server;
authenticating the REST request; and
sending the REST request to a configuration management service.

7. The method of claim 1, wherein step (i) or (ii) is implemented in response to receiving the request to establish the communication session.

8. The method of claim 1, wherein step (i) or (ii) is implemented in response to determining that the first configuration parameter is a re-bootable configuration parameter.

9. The method of claim 8, wherein the re-bootable configuration parameter is determined to be the re-bootable configuration parameter based on a defined list of one or more re-bootable configuration parameters, an object type, and/or a number range.

10. The method of claim 1, wherein in response to receiving the request to establish the communication session, step (i) is implemented.

11. The method of claim 1, wherein in response to receiving the request to establish the communication session, step (ii) is implemented.

12. A communication system comprising:
a microprocessor; and
a computer readable medium, coupled with the microprocessor and comprising microprocessor readable and executable instructions that cause the microprocessor to execute:
a configuration management service that receives a request to establish a communication session, and in response thereto perform one of:
(i) sending a request to a communication system to get a clone of a communication system object that includes configuration information and receiving the clone of a communication system object that includes configuration information; and (ii) creating the clone of the communication system object, sending a request to get the configuration information, receiving the configuration information, and populating the clone of the communication system object with the configuration information; and
receives a first request to update a first configuration parameter in the configuration information, and updates the first configuration parameter in the configuration information of the clone of the communication system object.

13. The communication system of claim 12, wherein the first request to update the first configuration parameter includes a session identifier and wherein the configuration management service:
sends the session identifier for the communication session, receives a second request that includes the session identifier to update a second configuration parameter in the configuration information and updates the second configuration parameter in the configuration information of the clone of the communication system object.

14. The communication system of claim 13, wherein the configuration management service receives a session save session command and in response to receiving the save session command: updates the clone of the communication system object and sends the updated clone of the communication system object.

15. The communication system of claim 14, wherein the communication system receives the updated clone of the communication system object and reboots the communication system in response to receiving the updated clone of the communication system object.

16. The communication system of claim 15, wherein the communication system sends a response that includes a status of the reboot in response to rebooting the communication system.

17. The communication system of claim 11, wherein the request to establish the communication session is Representational State Transfer (REST) request and further comprising:
a REST Hyper Text Transfer Protocol (HTTP) server that receives, from a client, the REST request, authenticate the REST request, and sends the REST request to the configuration management service.

18. The communication system of claim 11, wherein element (i) or element (ii) is implemented in response to receiving the request to establish the communication session.

19. The communication system of claim 11, wherein element (i) or element (ii) is implemented in response to determining that the first configuration parameter is a re-bootable configuration parameter.

20. The method of claim 1, wherein the first request to update the first configuration parameter includes a session identifier, wherein the session identifier is associated with the clone of the communication system object, and wherein the session identifier used to make updates of one or more re-bootable configuration parameters in the clone of the communication system object.

* * * * *